US009399938B2

(12) United States Patent
Werni et al.

(10) Patent No.: US 9,399,938 B2
(45) Date of Patent: Jul. 26, 2016

(54) EXHAUST GAS TREATMENT DEVICE

(71) Applicant: Eberspächer Exhaust Technology GmbH & Co. KG, Neunkirchen (DE)

(72) Inventors: Marcus Werni, Waiblingen (DE); Simon Ehrler, Ostfildern (DE); Kirill Karelin, Böblingen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 0 days.

(21) Appl. No.: 14/496,465

(22) Filed: Sep. 25, 2014

(65) Prior Publication Data

US 2015/0089931 A1    Apr. 2, 2015

(30) Foreign Application Priority Data

Sep. 27, 2013  (DE) .................. 10 2013 219 640

(51) Int. Cl.
*F01N 3/00*  (2006.01)
*F01N 3/035*  (2006.01)
*F01N 3/10*  (2006.01)
*F01N 13/00*  (2010.01)
*F01N 3/021*  (2006.01)
(Continued)

(52) U.S. Cl.
CPC ............... *F01N 3/035* (2013.01); *F01N 3/021* (2013.01); *F01N 3/0211* (2013.01); *F01N 3/103* (2013.01); *F01N 11/002* (2013.01); *F01N 13/008* (2013.01); *F01N 13/0097* (2014.06); *F01N 13/14* (2013.01); *F01N 2450/30* (2013.01); *F01N 2550/04* (2013.01); *F01N 2560/08* (2013.01); *Y02T 10/20* (2013.01)

(58) Field of Classification Search
USPC .......... 60/272, 276, 295, 297, 299, 300, 301, 60/303
See application file for complete search history.

(56) References Cited

U.S. PATENT DOCUMENTS

| 7,350,349 B2 * | 4/2008 | Olofsson ............. F01N 13/0097 181/237 |
| 8,091,353 B2 * | 1/2012 | Nakahira ................ F01N 3/025 60/286 |

(Continued)

FOREIGN PATENT DOCUMENTS

| DE | 10 2007 062 661 A1 | 6/2009 |
| DE | 10 2007 061 219 A1 | 6/2009 |

(Continued)

*Primary Examiner* — Binh Q Tran
(74) *Attorney, Agent, or Firm* — McGlew and Tuttle, P.C.

(57) ABSTRACT

An exhaust gas treatment device (1) includes a combustion waste gas inlet pipe (2), an outlet pipe, an essentially gas-tight inner housing (7) fluidically connected with the inlet pipe and fluidically connected with the outlet pipe. The inner housing receives a particle filter (4). A connection element (9) is arranged in a connection area (8) of the inner housing. The connection area fluidically faces the outlet pipe (3), for mechanically connecting the particle filter with the inner housing. An oxidation catalytic converter (5) is arranged upstream of the particle filter in the inner housing for catalyzing an oxidation reaction of the combustion waste gas. A counterpressure monitoring point (10, 11, 12) is provided fluidically between the oxidation catalytic converter and the connection element for measuring a counterpressure exerted by the particle filter during the operation of the treatment device. An internal combustion engine (24) is provided with the treatment device.

20 Claims, 4 Drawing Sheets

(51) Int. Cl.
*F01N 11/00* (2006.01)
*F01N 13/14* (2010.01)

(56) References Cited

U.S. PATENT DOCUMENTS

| | | | |
|---|---|---|---|
| 8,220,252 B2* | 7/2012 | Roach | F01N 3/2066 60/274 |
| 8,701,387 B2* | 4/2014 | Saito | F01N 3/0211 422/177 |
| 9,003,780 B2* | 4/2015 | Mitsuda | B01D 53/9477 285/917 |
| 9,140,154 B2* | 9/2015 | Mitsuda | E02F 9/00 |
| 9,140,157 B2* | 9/2015 | Noma | F01N 3/0235 |
| 2005/0056008 A1 | 3/2005 | Endo | |
| 2011/0167807 A1 | 7/2011 | Mitsuda | |
| 2015/0107458 A1 | 4/2015 | Werni et al. | |

FOREIGN PATENT DOCUMENTS

| | | |
|---|---|---|
| DE | 10 2009 014435 A1 | 10/2010 |
| DE | 10 2012 207960 B3 | 8/2013 |
| EP | 1 734 235 A1 | 12/2006 |
| EP | 2 075 430 A1 | 7/2009 |
| EP | 2 233 708 A1 | 9/2010 |
| JP | S61 74623 U | 5/1986 |
| WO | 2008/136203 A1 | 11/2008 |

\* cited by examiner

EXHAUST GAS TREATMENT DEVICE

CROSS REFERENCE TO RELATED APPLICATIONS

This application claims the benefit of priority under 35 U.S.C. §119 of German Patent Application DE 10 2013 219 640.7 filed Sep. 27, 2013, the entire contents of which are incorporated herein by reference.

FIELD OF THE INVENTION

The present invention pertains to an exhaust gas treatment device with an inlet pipe for admitting a combustion waste gas, an outlet pipe for discharging the combustion waste gas, an essentially gas-tight inner housing connected with the inlet pipe, on the one hand, and with the outlet pipe, on the other hand, for receiving a particle filter, a connection element arranged in a connection area of the inner housing, which said connection area fluidically faces the outlet pipe, for mechanically connecting the particle filter with the inner housing, and an oxidation catalytic converter arranged in the inner housing upstream of the particle filter for catalyzing an oxidation reaction of the combustion waste gas, and to an internal combustion engine with the exhaust gas treatment device.

BACKGROUND OF THE INVENTION

Methods for the mechanical, catalytic or chemical treatment of the combustion waste gases of furnaces, waste incinerators or other industrial plants, gas turbines or engines are combined under the general term exhaust gas treatment. An exhaust gas treatment carried out according to the state of the art, optionally combined with further measures affecting the mixture formation or combustion, reduces the pollutant output of conventional internal combustion engines.

While so-called regulated three-way catalytic converters have been part of the legally required minimum equipment for participation in public road traffic for, e.g., motor vehicles with spark ignition engines for a long time in numerous states, the state of the art provided for only insufficient exhaust gas treatment for the exhaust gases of comparable diesel engines over many years, because the higher air-to-fuel ratios of this engine variant compared to spark ignition engines imposes special functional requirements on corresponding means. In addition, the load of the diesel engine is set only by adapting the quantity of injected fuel, unlike in case of a spark ignition engine, in which it is set by adapting the total volume of the air-fuel ratio. Consequently, the particulate emission can be affected only slightly by limiting the fuel supply in case of diesel engines of this class.

The strict limitation of such particulate emissions required by law is therefore achieved in the state of the art with soot filters, which are also called soot particle filters (SPF) according to the composition of the particles to be filtered or diesel particle filters (DPF) according to the origin of these particulate emissions and aim to achieve a reduction of the concentration of these combustion residues remaining in the discharged exhaust gas stream. A catalytic converter (cat), which, combined with a diesel engine, often corresponds to the usual principles of action of a so-called oxidation catalytic converter or of the selective catalytic reduction (SCR), is also used for reducing emission of pollutants. Assembly units comprising such and other filters, catalytic converters or thermal reactors shall be combined under the term "exhaust gas treatment device" in the following descriptions.

Special attention is paid above all to the so-called pressure loss or pressure drop of the different exhaust gas treatment elements besides further fluidic operating parameters. In case of filters of this class, such a pressure difference arises already from the inherent flow resistance coefficient of the filter body in the original state thereof, which is due to the design and the material. However, the continual embedding and deposition of the solids separated from the exhaust gas stream, for example, in the form of a so-called filter cake, often increases the flow resistance considerably during the ongoing operation of the exhaust gas treatment device, so that the counterpressure exerted by the filter increases steadily as well. The rising counterpressure leads, in turn, to a steady reduction of the volume flow through the entire means.

SUMMARY OF THE INVENTION

A basic object of the present invention is therefore to create an exhaust gas treatment device which permits continuous monitoring of the counterpressure exerted by a filter on the exhaust gas stream. Another object of the present invention is to provide a corresponding internal combustion engine.

According to the invention, an exhaust gas treatment device is provided comprising an inlet pipe for admitting a combustion waste gas, an outlet pipe for discharging the combustion waste gas, a particle filter and an essentially gas-tight housing connected with the inlet pipe and connected with the outlet pipe. The gas-tight housing receives the particle filter. A connection element is arranged in a connection area of the gas-tight housing. The connection area fluidically faces the outlet pipe, for mechanically connecting the particle filter with the gas-tight housing. An oxidation catalytic converter is arranged in the gas-tight housing, upstream of the particle filter, for catalyzing an oxidation reaction of the combustion waste gas. A counterpressure-measurement point (connection) is provided fluidically between the oxidation catalytic converter and the connection element for measuring a counterpressure exerted by the particle filter during operation of the exhaust gas treatment device.

The present invention is consequently based on the basic discovery that a measurement point suitable for monitoring the counterpressure of a diesel particle filter does not necessarily have to be arranged directly upstream of the filter in question, contrary to the common opinion among experts. The design of modern exhaust gas treatment device, in which the diesel soot particle filter is accommodated by an essentially gas-tight inner housing fluidically connected with the inlet pipe and outlet pipe, rather makes possible a far more flexible positioning. Therefore, nearly any measurement point located in the area between an oxidation catalytic converter arranged upstream of the filter, on the one hand, and a connection element arranged downstream of the filter, on the other hand, is suitable, in principle, for determining the exact counterpressure.

One should think in this case, in principle, of any desired position on the circumference of the inner housing. A large number of design embodiment variants will thus become available to the person skilled in the art, and he can select from among these the counterpressure measurement point most advantageous from the viewpoint of the practical aspects of manufacture technology and from application-specific points of view.

In a preferred embodiment, the counterpressure-measurement point is designed in the form of a bushing, which is in contact with the inner housing on the end face and whose shape makes it possible to receive a pressure-measuring device of this class in an accurately fitting manner. The embodiment of such a bushing as a threaded bushing with a suitable screw thread makes it possible in this scenario to amplify the moderate circumferential force to be applied by the installer while screwing in the measuring device to a considerable axial force to such a degree that the bushing and the measuring device can become connected in a positive-locking and non-positive manner, which can likewise be released in a corresponding manner when needed. The resulting conversion of a comparatively great circumferential motion into an only slight axial motion will, moreover, enable the installer to perform an uncomplicated adjustment of the counterpressure-measuring means within the bushing thereof.

The counterpressure-measurement point provided according to the present invention does not rule out the design option of an additional outer housing of the exhaust gas treatment device by any means. It is rather possible without appreciable design measures to pass through such an outer housing, even in case the latter has a double-walled design, by means of the (threaded) bushing described.

The possible heat insulation of the exhaust gas treatment device by means of an insulation mat enclosed between the outer shell and the inner shell of the outer housing is not in conflict with the solution proposed, either. The bushing according to the present invention passes through the outer and inner housing shells as well as the insulating material enclosed between them in such a variant without going beyond the scope of the present invention. Orientation of the bushing at right angles to the wall of the outer housing is especially advantageous in this embodiment variant in order not to compromise the insulation properties.

Other design additions to the exhaust gas treatment device may be used, e.g., to further increase the desired reduction of the emission in respect to the output of nitrogen oxides, which is problematic precisely in diesel engines, compared to a simple soot particle filtration or to the use of a nitrogen oxide storage catalytic converter by means of selective catalytic reduction (SCR), while maintaining combustion conditions favorable for consumption.

Further important features and advantages of the present invention appear from the subclaims, from the drawings and from the corresponding description of the figures on the basis of the drawings.

It is apparent that the above-mentioned features, which will also be explained below, may be used not only in the particular combination indicated, but in other combinations or alone as well, without going beyond the scope of the present invention.

Preferred exemplary embodiments of the present invention are shown in the drawings and will be explained in more detail in the following description, where identical reference numbers designate identical or similar or functionally identical components.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
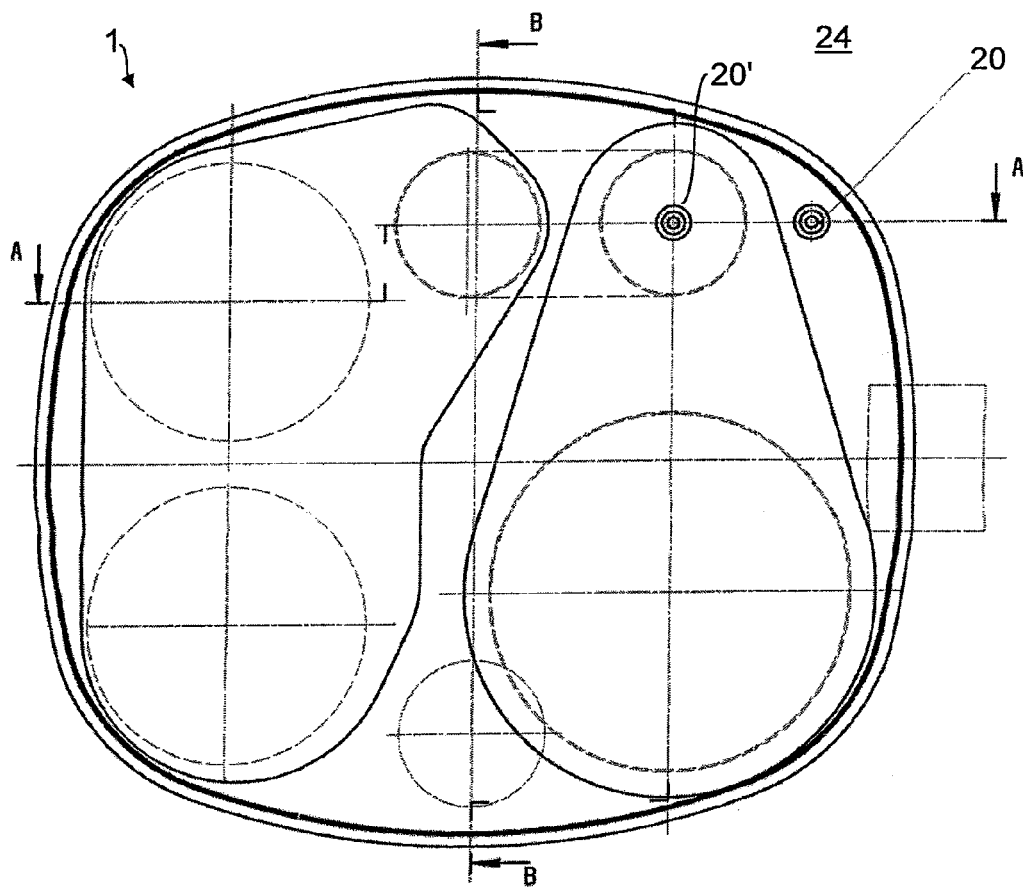
FIG. 1 is a cross-sectional view showing the general design of the exhaust gas treatment device of an internal combustion engine according to the present invention.

Referring to the drawings in particular, FIGS. 1 through 4 illustrate, based on the cross-sectional view in FIG. 1, the general design of an exhaust gas treatment device 1 according to the present invention as part of an internal combustion engine 24 designed as the common diesel engine. To reduce its nitrogen oxide emissions, the internal combustion engine 24 employs a selective catalytic reduction and comprises for this purpose a reducing agent nozzle 20, which is arranged concentrically to the exhaust gas flow and feeds an aqueous urea solution, e.g., one corresponding to DIN 70070, in the atomized form into the exhaust gas line of the internal combustion engine 24, which line passes through the interior of the exhaust gas treatment device 1. FIG. 1 shows an alternative positioning for a reducing agent nozzle 20' arranged eccentrically to the exhaust gas flow, but the principle of action of this nozzle also corresponds to the above descriptions.

Figure 2:
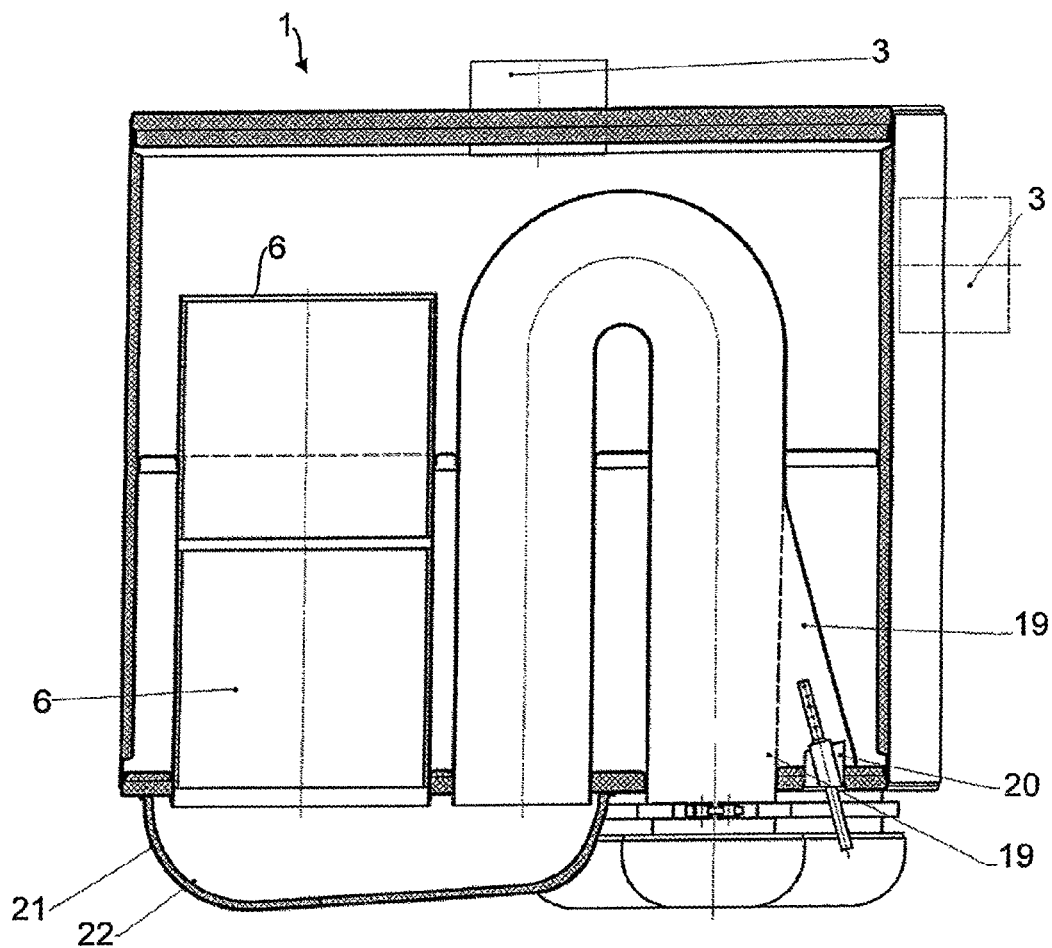
FIG. 2 is a sectional view of the exhaust gas treatment device taken along A-A in FIG. 1.

This principle of action appears more clearly on the basis of the section shown in FIG. 2 in plane A-A of FIG. 1. In particular, the position of the opening of the reducing agent nozzle 20 into a U-shaped mixing pipe 19 of the exhaust gas treatment device 1, in which the dispersion formed from combustion waste gas and injected urea solution forms carbon dioxide ($CO_2$) and ammonia ($NH_3$) by hydrolysis. The combustion waste gas mixed with the ammonia acting as a reducing agent will then enter via an inflow funnel 22 formed within a cap 21 in an SCR catalytic converter 6, which subjects it to the redox reaction proper at a corresponding operating temperature before it leaves the exhaust gas treatment device 1 via an outlet pipe 3.

Figure 3:
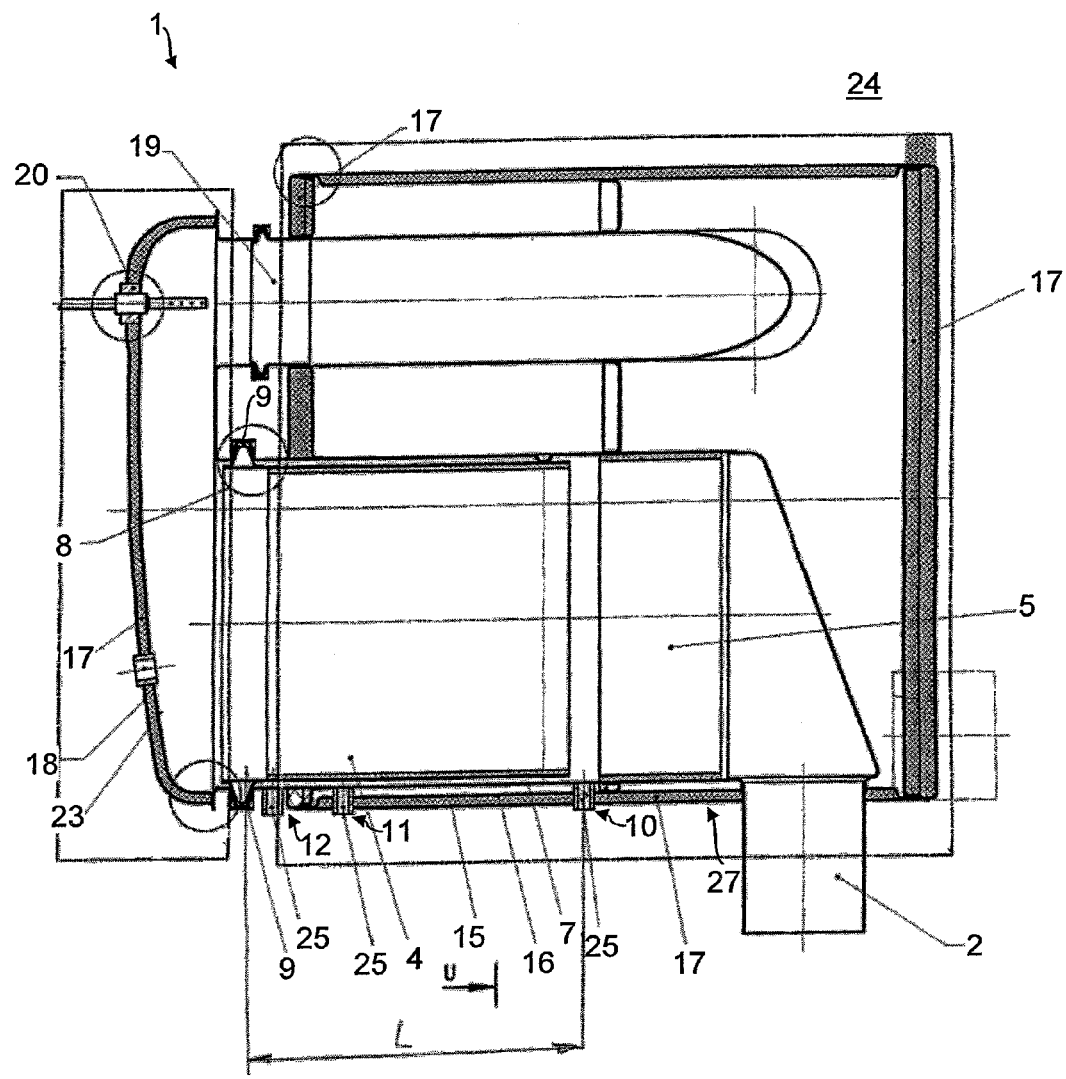
FIG. 3 is a sectional view of the exhaust gas treatment device in plane B-B in FIG. 1.

The design of the exhaust gas treatment device 1 in plane B-B in FIG. 1, which shall be explained below on the basis of the sectional view according to FIG. 3, is, however, essential for the present invention. The fluidic starting point of this arrangement is formed by the hollow cylindrical inlet pipe 2, which opens through an outer housing 15, 16 into the exhaust gas treatment device 1 and which feeds the combustion waste gas following at high temperature from the combustion chamber (not shown here) of the internal combustion engine 24 into the exhaust gas treatment device 1 at first to a conventional oxidation catalytic converter 5 extending at right angles to the inlet pipe 2 and hence essentially along the outer housing 15, 16. The combustion waste gas leaving the oxidation catalytic converter 5 with a reduced hydrocarbon (CmHn) content and reduced carbon monoxide content will then pass over into a particle filter 4 arranged downstream and in extension of the oxidation catalytic converter 5, at which the soot particles entrained by the exhaust gas stream can be deposited. The combustion waste gas treated up to this point will finally flow through the deflecting chamber 23 formed in an end-face cover 18 of the exhaust gas treatment device 1, which chamber guides the gas back into the interior of the means 1 over a U-shaped flow path.

Figure 4:
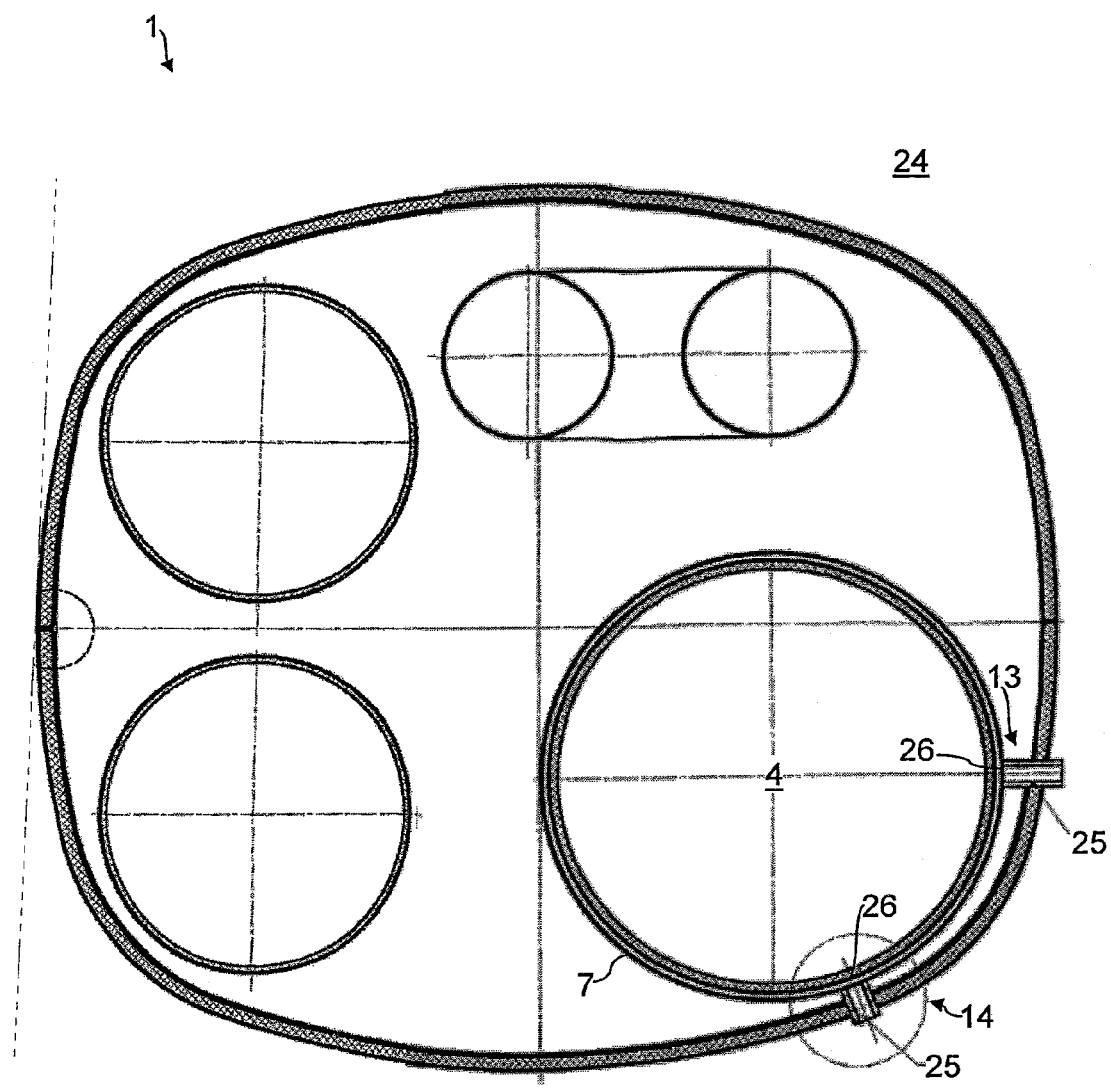
FIG. 4 is a sectional view of the exhaust gas treatment device in plane U-U in FIG. 1.

Five optional counterpressure-measurement points 10, 11, 12 (FIG. 3) as well as 13, 14 (FIG. 4), which are preferably provided alternatively and can be considered to be a characteristic feature of the present invention, are designated in this section plane B-B shown in FIG. 3 as well as in the section plane U-U extending at right angles to the planes A-A and B-B, which latter plane is shown in FIG. 4. Attention should be drawn here at first to the basic position of the first counterpressure-measurement point 10 according to FIG. 3, which corresponds to the current understanding, according to which a counterpressure measurement would allegedly have to take place by all means directly upstream of the particle filter 4 in question. This understanding is incorrect.

Contrary to this, the second and third counterpressure-measurement points 11, 12, which are marked according to FIG. 3 and are to be considered to be alternatives, already prove that counterpressure measurement is possibly practicable along the entire maximum length L of a particle filter 4, which is pushed completely into the inner housing 7 and is connected to same by means of a connection element 9 facing the deflection chamber 23. Accordingly, such a counterpressure measurement can be carried out not only, as in the case of the second counterpressure-measurement point 11, along the pushed-in particle filter 4. Without accepting major drifts, a third counterpressure-measurement point 12 can rather be provided even axially between the connection element 9 designed in the form of a so-called V clamp and an outer housing 27, into which the inner housing 7 is inserted.

A large number of conceivable counterpressure-measurement points, which are clearly shown in FIG. 4 on the basis of a fourth counterpressure-measurement point 13 as well as a fifth counterpressure-measurement point 14, will become available to the person skilled in the art in the circumferential direction of the inner housing 7 as well. One of each of these counterpressure-measurement points 10, 11, 12, 13, 14 may prove to be especially suitable, depending on the application, for receiving a pressure-measuring device or pressure gauge of this class, which can be screwed, e.g., into a bushing 25 in the form of a threaded bushing, which is located at the selected counterpressure-measurement point, for securing the position and facilitating installation. The inner housing 7 has an opening 26 (cf. FIG. 4) at the intended counterpressure-measurement point 10-14 for this purpose in the extension of the bushing 25. The bushing 25 is open axially on both sides. The outer housing 27 arranged outside the inner housing 7 may be of the double-walled design and this bushing 25 will likewise pass through it, possibly together with the outer shell 15 thereof, with the inner shell 16 arranged therein as well as with the insulation mat 17 enclosed in a fluid-tight manner between the outer shell 15 and the inner shell 16 in case of the first counterpressure-measurement point 10 and the second counterpressure-measurement point 11.

While specific embodiments of the invention have been shown and described in detail to illustrate the application of the principles of the invention, it will be understood that the invention may be embodied otherwise without departing from such principles.

What is claimed is:

1. An exhaust gas treatment device comprising:
    an outer housing;
    an inlet pipe, connected to the outer housing, for admitting a combustion waste gas;
    an outlet pipe, connected to the outer housing, for discharging the combustion waste gas;
    a particle filter;
    an essentially gas-tight inner housing connected with the inlet pipe and connected with the outlet pipe, the gas-tight inner housing for receiving the particle filter, the gas-tight inner housing being arranged at least partially within the outer housing;
    a connection element arranged in a connection area of the gas-tight inner housing, said connection area fluidically facing the outlet pipe, the particle filter being pushed completely into the gas-tight inner housing and the connection element mechanically connecting the particle filter with the gas-tight inner housing at a downstream end of the particle filter;
    an oxidation catalytic converter, arranged in the gas-tight inner housing upstream of the particle filter, for catalyzing an oxidation reaction of the combustion waste gas; and
    a counterpressure-measurement fluidic connection from an exterior of the gas-tight inner housing to an interior of the gas-tight inner housing and provided fluidically between the oxidation catalytic converter and the connection element for measuring a counterpressure exerted by the particle filter during operation of the exhaust gas treatment device.

2. An exhaust gas treatment device in accordance with claim 1, wherein the counterpressure-measurement connection is located on a circumferential surface of the gas-tight inner housing.

3. An exhaust gas treatment device in accordance with claim 2, wherein:
    the gas-tight inner housing has an opening at the counterpressure-measurement connection; and
    the counterpressure-measurement connection has a bushing that is in contact with the opening on the end face for receiving a pressure-measuring device, wherein the bushing passes through the outer housing essentially at right angles to an outer housing surface.

4. An exhaust gas treatment device in accordance with claim 3, wherein the bushing comprises a screw thread for screwing the pressure-measuring device into the bushing.

5. An exhaust gas treatment device in accordance with claim 3, further comprising an insulation mat, wherein:
    the outer housing comprises an outer shell and an inner shell;
    the insulation mat is enclosed in the outer housing, in a fluid-tight manner, between the outer shell and the inner shell and is arranged within the outer shell for heat insulation of the exhaust gas treatment device; and
    the bushing passes through the outer shell, the inner shell and further through the insulation mat.

6. An exhaust gas treatment device in accordance with claim 1, wherein the outer housing partially encloses the gas-tight inner housing and from the outer housing the gas-tight inner housing protrudes axially wherein the counterpressure-measurement connection is arranged along an axial length of the exhaust gas treatment device between the connection element and the outer housing.

7. An exhaust gas treatment device in accordance with claim 3, further comprising:
    a mixing pipe fluidically connected with the particle filter for mixing the combustion waste gas with an ammonia-containing reducing agent based on an aqueous urea solution;
    a reducing agent nozzle opening into the mixing pipe for atomizing the reducing agent; and
    at least one SCR catalytic converter fluidically connected with the mixing pipe and fluidically connected with the discharge pipe, for catalyzing a reduction reaction of the combustion waste gas by means of the reducing agent.

8. An exhaust gas treatment device in accordance with claim 7, further comprising a cap connected detachably with the outer housing for covering the SCR catalytic converter.

9. An exhaust gas treatment device in accordance with claim 8, further comprising:
an inflow funnel formed in the cap and fluidically connected with the mixing pipe and fluidically connected with the SCR catalytic converter, the inflow funnel for introducing the combustion waste gas mixed with the reducing agent into the SCR catalytic converter.

10. An exhaust gas treatment device in accordance claim 7, further comprising a detachable cover arranged downstream of the connection area for covering the gas-tight inner housing.

11. An exhaust gas treatment device in accordance with claim 10, further comprising:
a cap connected detachably with the outer housing for covering the SCR catalytic converter; and
a deflecting chamber, which is formed in the cap and is connected fluidically with the gas-tight inner housing and is connected fluidically with the mixing tube, for deflecting the combustion waste gas from the particle filter into the mixing pipe.

12. An exhaust gas treatment device in accordance with claim 10, wherein the gas-tight inner housing is elongated and is shaped such that the particle filter can be pushed into the gas-tight inner housing over a preset maximum length and can be connected with the gas-tight inner housing by means of the connection element when the cover is detached.

13. An exhaust gas treatment device in accordance with claim 1, wherein the connection element comprises a detachable clamp profiled in a V-shaped manner for fastening the particle filter in the gas-tight inner housing.

14. An exhaust gas treatment device in accordance with claim 1, wherein:
the exhaust gas treatment device encloses the particle filter and the particle filter is a soot particle filter comprising:
at least one gas-permeable substrate for separating soot particles from the combustion waste gas;
a gas-tight jacket enclosing the substrate; and
a mounting mat arranged between the substrate and the gas-tight inner housing for mounting the substrate in the gas-tight inner housing.

15. An internal combustion engine comprising:
at least one combustion chamber for combusting a fuel while a combustion waste gas is discharged;
an exhaust gas treatment device fluidically connected with the combustion chamber, the exhaust gas treatment device comprising:
an outer housing;
an inlet pipe, connected to the outer housing, for admitting the combustion waste gas;
an outlet pipe, connected to the outer housing, for discharging the combustion waste gas;
a particle filter;
an essentially gas-tight inner housing connected with the inlet pipe and connected with the outlet pipe, the gas-tight inner housing for receiving the particle filter;
a connection element arranged in a connection area of the gas-tight inner housing, said connection area fluidically facing the outlet pipe, the particle filter being pushed completely into the gas-tight inner housing and the connection element mechanically connecting the particle filter with the gas-tight inner housing at a downstream end of the particle filter;
an oxidation catalytic converter arranged in the gas-tight inner housing upstream of the particle filter for catalyzing an oxidation reaction of the combustion waste gas; and
a counterpressure-measurement fluidic connection from an exterior of the gas-tight inner housing to an interior of the gas-tight inner housing provided fluidically between the oxidation catalytic converter and the connection element for measuring a counterpressure exerted by the particle filter during operation of the exhaust gas treatment device.

16. An internal combustion engine in accordance with claim 15, wherein:
the counterpressure-measurement connection is on a circumferential surface of the gas-tight inner housing;
the gas-tight inner housing has an opening at the counterpressure-measurement connection; and
the counterpressure-measurement connection has a bushing that is in contact with the opening on the end face for receiving a pressure-measuring device, wherein the bushing passes through the outer housing essentially at right angles to an outer housing surface.

17. An internal combustion engine in accordance with claim 16, wherein the bushing comprises a screw thread for screwing the pressure-measuring device into the bushing.

18. An internal combustion engine in accordance with claim 17, further comprising an insulation mat, wherein:
the outer housing comprises an outer shell and an inner shell;
the insulation mat is enclosed in the outer housing, in a fluid-tight manner, between the outer shell and the inner shell and is arranged within the outer shell for heat insulation of the exhaust gas treatment device; and
the bushing passes through the outer shell, the inner shell and further through the insulation mat.

19. An exhaust gas treatment device comprising:
an outer housing;
an inlet pipe, connected to the outer housing, for admitting a combustion waste gas;
an outlet pipe, connected to the outer housing, for discharging the combustion waste gas;
a particle filter;
an essentially gas-tight inner housing connected with the inlet pipe and connected with the outlet pipe, the gas-tight inner housing for receiving the particle filter, the gas-tight inner housing being arranged at least partially within the outer housing;
a connection element arranged in a connection area of the gas-tight inner housing, said connection area fluidically facing the outlet pipe, the particle filter being pushed completely into the gas-tight inner housing and the connection element mechanically connecting the particle filter with the gas-tight inner housing at a downstream end of the particle filter;
an oxidation catalytic converter, arranged in the gas-tight inner housing upstream of the particle filter, for catalyzing an oxidation reaction of the combustion waste gas; and
a counterpressure-measurement fluidic connection from an exterior of the gas-tight inner housing to an interior of the gas-tight inner housing and comprising an opening through a circumferential surface of the gas-tight inner housing and a bushing having a bushing measuring device interface for receiving a pressure-measuring device, the counterpressure-measurement fluidic connection fluidically communicating with an interior of the gas-tight inner housing via the opening, the counterpressure-measurement connection being provided fluidically between the oxidation catalytic converter and the connection element for measuring a counterpressure exerted by the particle filter during operation of the exhaust gas treatment device.

20. An exhaust gas treatment device according to claim 19, wherein the particle filter has an axial extent and the counter-pressure-measurement connection opening is provided along the axial extent of the particle filter or between the particle filter and the connection element.

* * * * *